(12) United States Patent
Bernett

(10) Patent No.: US 6,970,322 B2
(45) Date of Patent: Nov. 29, 2005

(54) BULKHEAD CONNECTOR FOR LOW LEAK RATE DISC DRIVES

(75) Inventor: Frank W. Bernett, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 211 days.

(21) Appl. No.: 10/464,590

(22) Filed: Jun. 18, 2003

(65) Prior Publication Data

US 2004/0257698 A1    Dec. 23, 2004

(51) Int. Cl.[7] ............................................. G11B 33/14
(52) U.S. Cl. ............................. 360/97.01; 360/97.02; 360/245.9
(58) Field of Search .................. 360/97.01, 97.02, 360/98.01, 245.8, 245.9, 264.2

(56) References Cited

U.S. PATENT DOCUMENTS

| | | | | |
|---|---|---|---|---|
| 5,097,366 A | | 3/1992 | Ueki | 360/97.02 |
| 5,241,438 A | * | 8/1993 | Matsushima | 360/254.8 |
| 5,276,577 A | * | 1/1994 | Brooks et al. | 360/97.02 |
| 5,357,386 A | | 10/1994 | Haidari | 360/97.02 |
| 5,454,157 A | * | 10/1995 | Ananth et al. | 29/603.03 |
| 5,632,628 A | * | 5/1997 | Wagner | 439/78 |
| 5,780,771 A | | 7/1998 | Beckwith | 174/17.08 |
| 6,135,782 A | | 10/2000 | Cox | 439/65 |
| 6,168,459 B1 | | 1/2001 | Cox | 439/495 |
| 6,678,112 B1 | * | 1/2004 | Kaneko | 360/97.01 |
| 6,697,217 B1 | * | 2/2004 | Codilian | 360/97.01 |
| 6,856,490 B2 | * | 2/2005 | Rosner et al. | 360/264.2 |
| 2002/0167792 A1 | | 11/2002 | Osterhout | 361/685 |
| 2003/0016468 A1 | | 1/2003 | Hayakawa | 360/97.01 |

* cited by examiner

Primary Examiner—Jefferson Evans
(74) Attorney, Agent, or Firm—Fellers, Snider, et al.

(57) ABSTRACT

A disc drive has a rotatable disc carried by a spindle motor and an actuator assembly with a read/write head. A base deck supports the spindle motor and the actuator assembly and defines a connector opening for transmitting electrical signals from the read/write head through the base deck to a printed circuit board attached to an exterior surface of the base deck. A bulkhead connector is adhesively affixed to the base deck to cover the connector opening. The bulkhead connector comprises a backing plate and a flex circuit bonded to the backing plate. The flex circuit extends across a top surface of the backing plate, wraps around one edge of the backing plate, and extends across a bottom surface of the backing plate.

23 Claims, 5 Drawing Sheets

BULKHEAD CONNECTOR FOR LOW LEAK RATE DISC DRIVES

FIELD OF THE INVENTION

The invention relates generally to the field of disc drives. More particularly, the invention relates to an improved bulkhead connector for low leak rate disc drives.

BACKGROUND OF THE INVENTION

A disc drive typically includes a base deck to which various components of the disc drive are mounted. A top cover cooperates with the base to form a housing that defines an internal, sealed environment for the disc drive. The components include a spindle motor, which rotates one or more discs at a constant high speed. Information is written to and read from tracks on the discs through the use of an actuator assembly. The actuator assembly includes actuator arms, which extend towards the discs, with one or more suspensions or flexures extending from each of the actuator arms. Mounted at the distal end of each of the flexures is a read/write head, which includes an air bearing slider enabling the head to fly in close proximity above the corresponding surface of the associated disc. Conductors from the read/write head pass through a flex circuit to a bulkhead connector that provides access to the conductors of the flex circuit through the base deck. Specifically, the bulkhead connector typically forms an electrical connection between the flex circuit within the drive and a printed circuit board mounted to an exterior surface of the base deck.

Disc drives are constructed in a clean room environment to prevent contaminants from entering the drive prior to the final assembly of the drive. Thus, the atmosphere within the assembled disc drive is typically that of the clean room, i.e., the filtered room air that is trapped within the drive once the cover is sealed to the base. While the seals between the base and the cover and around the bulkhead connector are sufficient to keep contaminants from entering the drive, it is possible for air and other gases to seep past (or permeate through) the seals and either enter or exit the drive. However, such small gas leaks are not an issue since most drives include a filtered port to equalize the air pressure within the drive to that of the ambient air pressure in order to prevent large stresses from being applied to the drive (such as during air shipment of the disc drive where the ambient air pressure is relatively low).

While air filled disc drives are currently prevalent, it is known that filling disc drives with low-density gases other than air (i.e., a gas such as helium having a lower density than air at similar pressures) can enhance drive performance. For example, helium (or another low density gas) can reduce the aerodynamic drag experienced by the spinning discs within the drive, thereby reducing the power requirements for the spindle motor. A helium filled drive thus uses substantially less power than a comparable disc drive that operates in an air environment. Additionally, the reduction in drag forces within the helium filled drive also reduces the amount of aerodynamic turbulence that is experienced by the drive components such as the actuator arms, the suspensions and the heads. These reductions in spindle motor power and "aerodynamic" turbulence allow drives filled with low density gases to be operated at higher speeds than conventional air filled drives while maintaining the same tolerances (e.g., the same percentage of read/write errors). Additionally, helium filled drives may allow for higher storage capacities (i.e., higher recording densities) due to the fact that there is less turbulence within the drive and the heads may fly more closely to the disc surface.

Despite the advantages of helium filled drives, such drives have not been commercially successful. This is mainly due to problems associated with the helium (or other low density gas) leaking from the drives over time. Unlike air filled disc drives, helium filled drives do not include a filtered port to equalize the pressure within the drive to the ambient pressure. However, while helium drives are completely sealed, it is still possible for the helium gas to leak out past the conventional rubber gasket seals used to seal the top cover to the drive base and to seal the bulkhead connector. Such leakage is not surprising given the relatively smaller size (lower atomic weight) of the helium atoms in comparison to the constituent gases found in air (i.e., nitrogen and oxygen). That is, the rubber gasket seals allow the relatively smaller helium atoms to diffuse through the rubber membrane. Indeed, such gaskets do not provide hermetic seals with respect to air (i.e., the gaskets are also permeable to the larger atoms of nitrogen and oxygen in air) since it is air that typically displaces the helium gas that leaks from the drive.

To reduce this leakage, improvements have primarily been made to the seal between the base and the cover. For example, some disc drives may include a second, sealing cover in addition to a structural cover. In such a case, the sealing cover may be installed over the structural cover and sealed with an adhesive to reduce leakage. However, typical bulkhead connectors still employ a gasket to provide a seal between the bulkhead connector and the base deck. Therefore, the bulkhead connector still presents a leakage problem.

As noted above, gasket seals are only intended to keep relatively large contaminants such as dust or smoke from the interior of the drive. Such gasket seals are preferred to other, more permanent methods of sealing a drive for two main reasons. First, the seals do not outgas and thus do not contribute to the contamination of the interior of the drive. Secondly, the seals may be reused if necessary during the assembly of the disc drive, such as when an assembled drive fails to pass certification testing and must be "reworked." Unfortunately, while such gasket seals are convenient, they simply do not provide a sufficient hermetic seal to maintain the required concentration of helium (or other low density gas) within the disc drive over the service life of the drive.

As helium leaks out of a disc drive and is replaced by air, the drive is subjected to undesirable operational effects possibly leading to failure of the drive. For example, the increased concentration of air may increase the turbulent forces on the drive heads due to the increased drag forces within the drive, and may further cause the heads to fly at too great a distance above the discs, thereby increasing the instances of read/write errors. The risk of unexpected failure due to inadequate amounts of helium is a considerable drawback to helium filled disc drives, particularly since the data stored within the disc drive can be irretrievably lost if the disc drive fails.

Accordingly there is a need for an improved disc drive that can effectively prevent helium (or another low density gas) from leaking out of the drive, and particularly from around the bulkhead connector. The present invention provides a solution to this and other problems, and offers other advantages over the prior art.

SUMMARY OF THE INVENTION

According to one embodiment of the present invention, a disc drive has at least one disc rotated by a spindle motor and an actuator assembly with a read/write head. A base deck supports the spindle motor and the actuator assembly and defines a connector opening for passing electrical signals through the base deck. A bulkhead connector adhesively affixed to the base deck covers the connector opening. The bulkhead connector comprises a backing plate and a flex circuit bonded to the backing plate. The flex circuit extends across a top surface of the backing plate, wraps around one edge of the backing plate, and extends across a bottom surface of the backing plate.

Another embodiment of the present invention includes a method of hermetically sealing a bulkhead connector to a base deck of a disc drive. The method comprises bonding a flex circuit to a backing plate to form the bulkhead connector. The flex circuit extends across a top surface of the backing plate, wraps around one edge of the backing plate, and extends across a bottom surface of the backing plate. The bulkhead connector is adhesively affixed to the base deck of the disc drive.

These and various other features of the present invention will be apparent from a reading of the following detailed description and a review of the associated drawings.

BRIEF DESCRIPTION OF THE DRAWINGS

The appended claims set forth the features of various embodiments of the invention with particularity. These embodiments, together with their advantages, may be best understood from the following detailed description taken in conjunction with the accompanying drawings of which:

DETAILED DESCRIPTION

In the following description, for the purposes of explanation, numerous specific details are set forth in order to provide a thorough understanding. It will be apparent, however, to one skilled in the art that embodiments of the present invention may be practiced without some of these specific details. In other instances, well-known structures and devices are shown in block diagram form.

Figure 1:
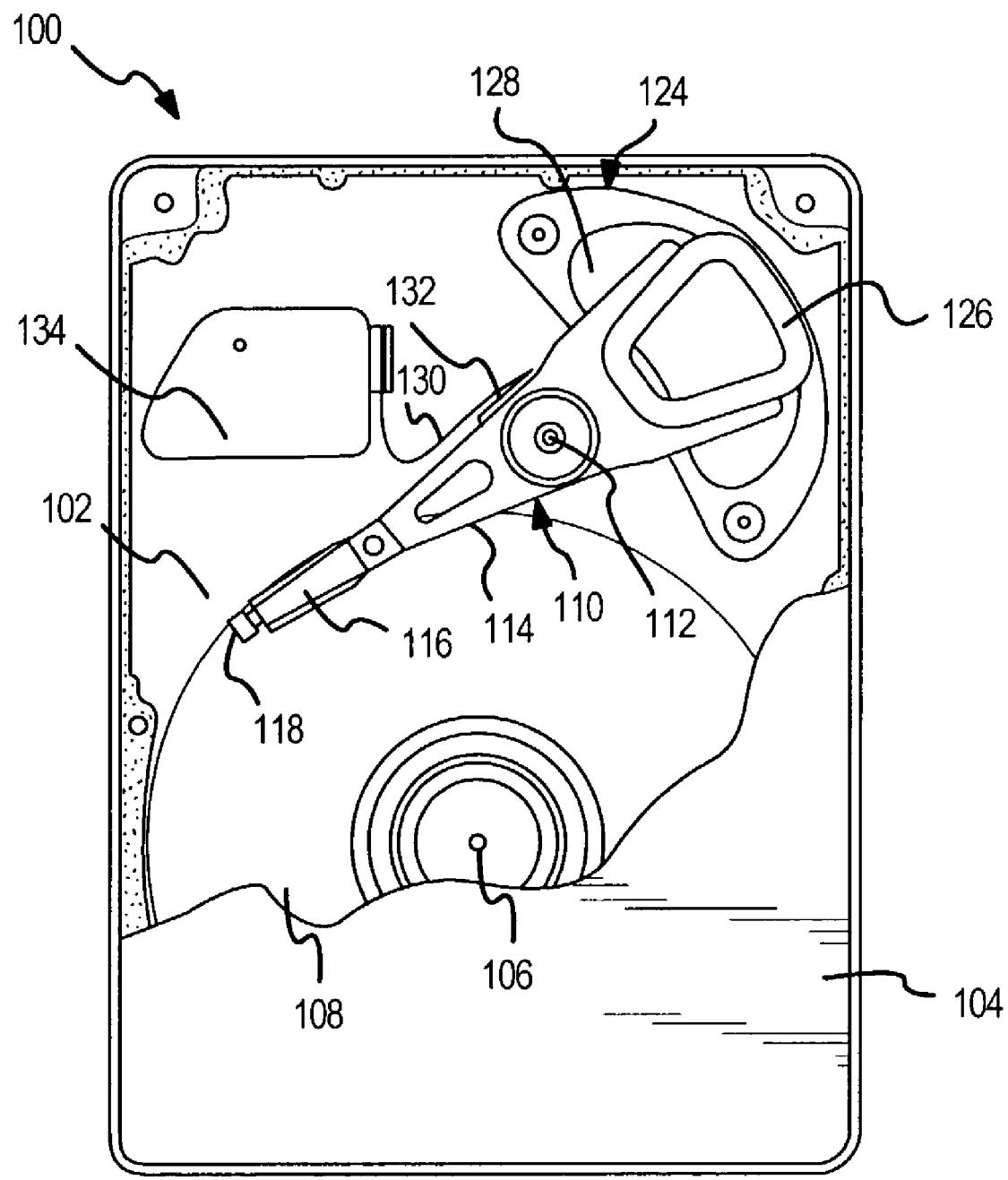
FIG. 1 is a plan view of a prior art disc drive showing the primary internal components of the disc drive.

FIG. 1 is a plan view of a prior art disc drive 100 showing the primary internal components of the disc drive. The disc drive 100 includes a base 102 to which various components of the disc drive 100 are mounted. The drive components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes a slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly 130 terminates at a bulkhead connector 134 for communication through the base deck 102 to a disc drive printed circuit board (not shown) mounted to the bottom side of the disc drive 100.

Figure 2:
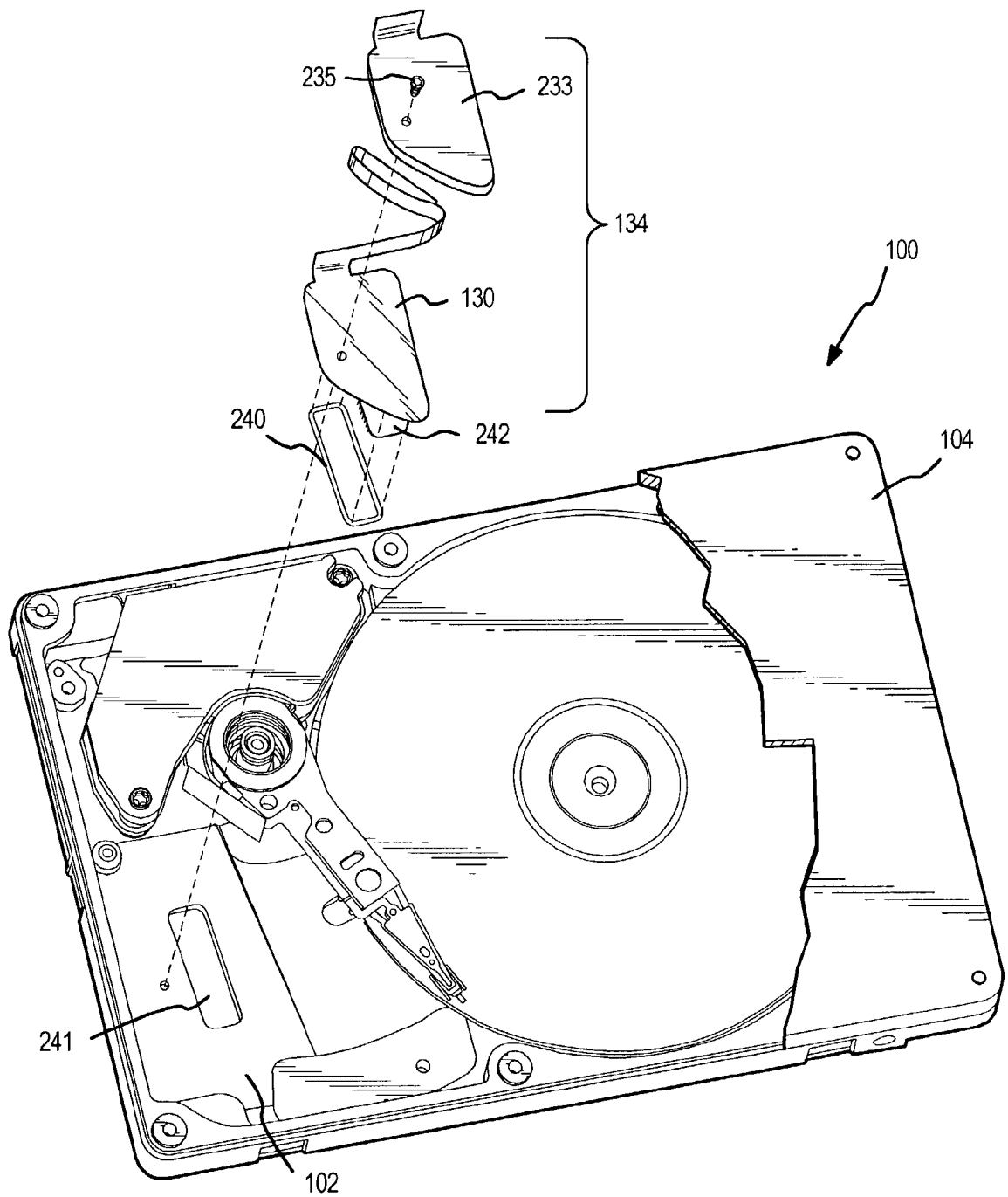
FIG. 2 is an isometric view of the prior art disc drive of FIG. 1 including an exploded view of a prior art bulkhead connector.

FIG. 2 is an isometric view of the disc drive 100 including an exploded view of the prior art bulkhead connector 134. The base deck 102 includes a port 241 through which electrical connections may be made. The bulkhead connector 134 is shown exploded out from the base deck 102. The flex assembly 130 is connected with an electrical connector 242 that passes through the port 241 in the base deck 102 when the bulkhead connector 134 is assembled to the base deck 102. The connector 242 may by any one of a variety of electrical connectors commonly available. For example, sockets, pins, edge connectors, contact pads, etc. may be used with the connector 242. Additionally, the flex assembly 130 may be electrically connected to the connector 242 using a variety of means including but not limited to solder, pins, contact pads, etc.

The flex assembly 130 and connector 242 are secured to the base deck 102 by a flex bracket 233. The assembled bulkhead connector 134, comprising the flex bracket 233, the flex assembly 130, and the connector 242, is secured to the base deck 102 by at least one fastener 235. This fastener 235 may be any of a variety of commonly available fasteners such as a screw, bolt, rivot, etc. Alternatively, some form of latch, clip or spring may be used to secure the assembled bulkhead connector 134 to the base deck 102.

A gasket 240 preferably extends between the base deck 102 and the flex assembly 130 and surrounds the connector 242. When the assembled bulkhead connector 134 is secured to the base deck 102 the gasket 240 is compressed between the flex assembly 130 and the base deck 102 providing a seal between the outside atmosphere and the internal atmosphere of the disc drive 100.

However, as stated above, gasket seals such as molded rubber gaskets are only intended to keep relatively large contaminants such as dust or smoke from the interior of the drive. Unfortunately, while such gasket seals are convenient, they do not provide a sufficient hermetic seal to maintain the required concentration of helium (or other low density gas) within the disc drive over the service life of the drive.

Figure 3:
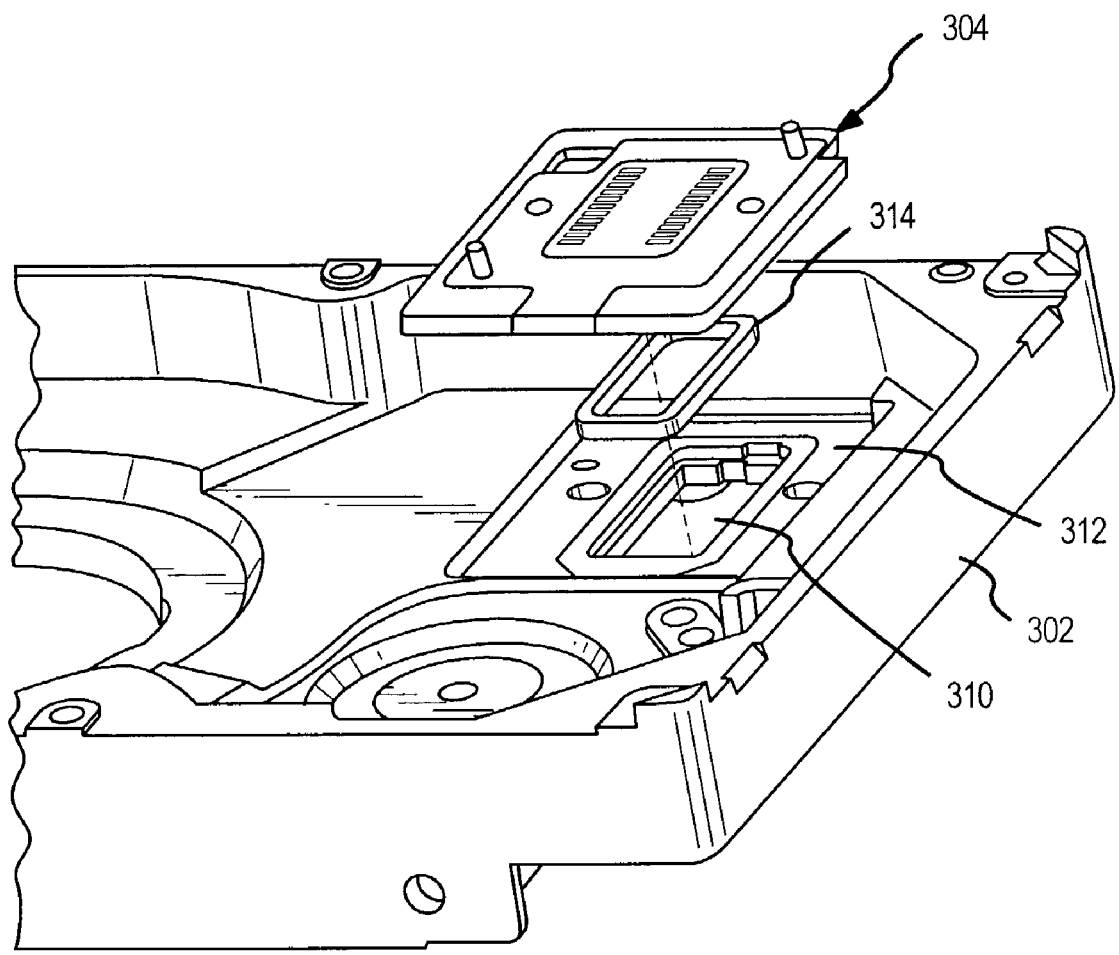
FIG. 3 is an isometric view of a disc drive base deck according to one embodiment of the present invention illustrating an exploded view of a bulkhead connector according to one preferred embodiment of the present invention.

FIG. 3 is an isometric view of a disc drive base deck according to one embodiment of the present invention illustrating an exploded view of a bulkhead connector according to one preferred embodiment of the present invention. This example illustrates a base deck 302 of a disc drive. The base deck 302 includes a connector opening 310 through which electrical connections may be made. According to one embodiment, the base deck 302 may also include a recessed area 312 surrounding the connector opening 310. Alternatively, there may be no recessed area 312 or a differently shaped recessed area 312 as will be discussed below.

A bulkhead connector 304 is shown exploded out from the base deck 302. According to one embodiment, when assembled, the bulkhead connector 304 fits into the recessed area 312 of the base deck 302 and covers the connector opening 310. If no recessed area 312 is present, the bulkhead connector 304 mounts on top of the base deck 302. The dimensions of the bulkhead connector 304 may vary in relation to the size and shape of the recessed area 312 and/or the available space on the base deck 302. Additional details of the bulkhead connector 304 will be discussed below with reference to FIGS. 4 through 6.

An electrical connector (not shown in this view) on the bottom of the bulkhead connector 304 aligns with the connector opening 310 in the base deck 302. The connector provides access to the conductors of the bulkhead connector 304 through the base deck 302 and may be any one of a variety of electrical connectors commonly available. For example, sockets, pins, edge connectors, contact pads, and other types of connectors may be used.

According to one embodiment, rather than using a gasket to provide a seal between the bulkhead connector 304 and the base deck 302 when assembled, an adhesive is preferably used. In this embodiment, the adhesive may be a liquid type of adhesive. Since liquids readily fill voids, a liquid adhesive provides a more complete seal than non-liquids. Examples of adhesive types that may be used include but are not limited to epoxies, acrylics, hot metal adhesives, and other types of adhesives. Additional details of the adhesive are discussed below.

In the example illustrated in FIG. 3, a gasket 314 is shown positioned between the bulkhead connector 304 and the base deck 302. The gasket 314 does not provide a seal between the base deck 302 and the bulkhead connector 304. Rather, the gasket 314 serves to prevent excess adhesive from seeping into the electrical connector (not shown in this view) on the bottom of the bulkhead connector 304 when the bulkhead connector 304 is pressed into the recessed area 312 of the base deck 302 during assembly. The seal between the bulkhead connector 304 and the base deck 302 is provided by a thin layer of adhesive between the metal surfaces of the bulkhead connector 304 and the base deck 302 (as described below) rather than by the gasket 314.

Figure 4:
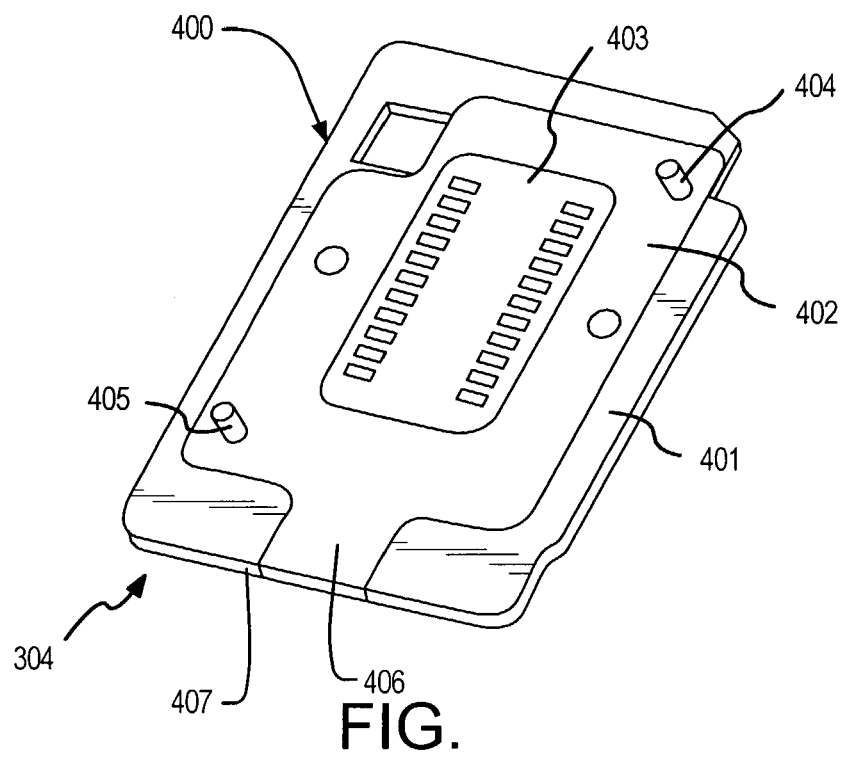
FIG. 4 is an enlarged top isometric view of the bulkhead connector illustrated in FIG. 3.

FIG. 4 is an enlarged top isometric view of the bulkhead connector illustrated in FIG. 3. This example illustrates the bulkhead connector 304 comprising a substantially rectangular backing plate 400. As described above with reference to FIG. 3, the exact shape and dimensions of the backing plate 400 may vary widely but may be influenced by the size and shape of the recessed area 312, if any, in the base deck 302 of the disc drive.

According to one embodiment, bonded to the backing plate 400 is a flex circuit conductor 402. As will be seen in FIG. 5 described below, the flex circuit 402 from the top surface 401 of the backing plate 400 extends, in the form of a pigtail 406, to one edge 407 of the backing plate 400. The pigtail 406 of the flex circuit 402 wraps around the edge 407 of the backing plate 400 and extends along the bottom surface of the backing plate 400 as described below.

According to another embodiment, the flex circuit 402 may be bonded to the backing plate 400 only on the bottom side of the backing plate 400. That is, the backing plate 400 when mounted on base deck 302, clamps the flex circuit 402 to the base deck 302. The end of the flex circuit 402 extends freely from beneath the backing plate 400 at one edge 407 of the backing plate 400 but is not attached to backing plate 400 at any other point. Electrical connection may be made to the free end of the flex circuit 402 wither via a connector mounted on the flex circuit 402 or by another means.

The example illustrated in FIG. 4 also shows an optional connector 403 mounted on the flex circuit 402 on the top surface 401 of the backing plate 400 to provide access to the conductors of the flex circuit 402. This example illustrates a contact pad type connector. However, other types of connectors may be used. For example, pins, edge connectors, sockets, or other types of connectors may be used. In an assembled disc drive, the connector 403 is electrically coupled with the read/write heads of an actuator assembly via a flex assembly (not shown).

Also shown in the example illustrated by FIG. 4 are two optional aligning features such as posts 404 and 405. These, or similar posts, may be used to align a flex assembly connector with the connector 403 mounted on the top of the flex circuit 402. The size, shape, and position of these posts 404 and 405 may vary widely depending on the configuration of the flex assembly connector. Alternatively, no posts may be used or alternative structures may be used to perform the same aligning function. For example, a ridge along one or more sides of the connector 403 or some form of latch may be used to align connectors.

Figure 5:
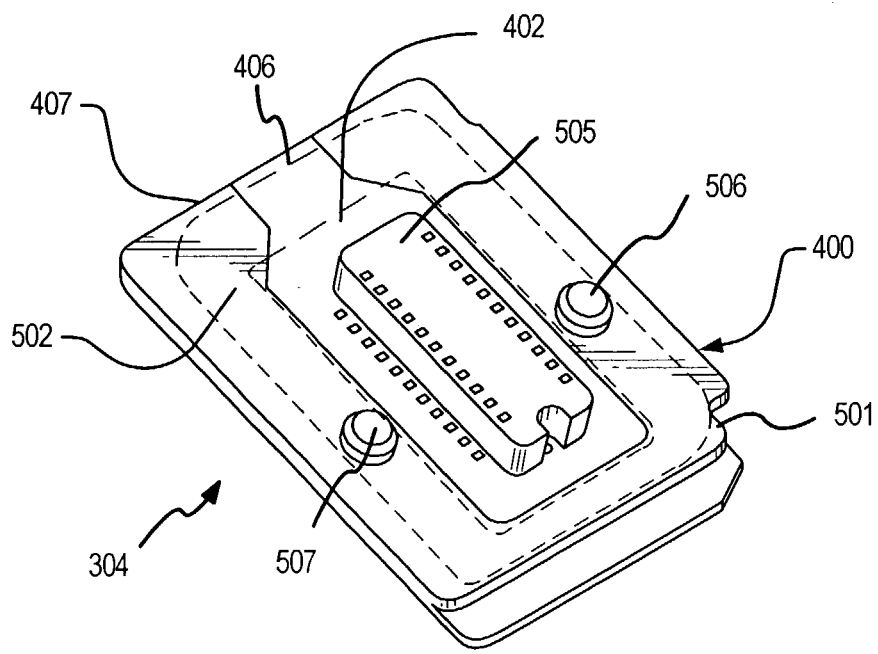
FIG. 5 is an enlarged bottom isometric view of the bulkhead connector illustrated in FIG. 3.

FIG. 5 is an enlarged bottom isometric view of the bulkhead connector 304 illustrated in FIG. 3. Bonded to the backing plate 400 is the portion of the flex circuit conductor 402 extending from the pigtail 406 that wraps around the edge 407 from the top of the backing plate 400. The flex circuit 402 thus extends across the bottom surface 501 of the backing plate 400.

An adhesive may be applied to the bottom surface 501 of the backing plate 400 to form a bond joint 502. The leak rate of the adhesive bond between the bulkhead connector 304 and the base deck 302 is inversely proportional to the width of the bond joint 502. That is, a larger backing plate 400 allowing a wider adhesive bond joint 502 has a lower leak rate than a smaller backing plate 400 with a narrower bond joint 502. According to one embodiment, the bond joint 502 is approximately 0.25 inches wide and is positioned between the edges of the backing plate 400 and the connector. According to another embodiment, the width of the bond joint 502 is maintained evenly around the perimeter of the bulkhead connector 304.

The example illustrated in FIG. 5 also shows an optional connector 505 mounted on the flex circuit 402 to provide access to the conductors of the flex circuit 402. This example illustrates a socket type connector. However, other types of connectors may be used. For example, pins, edge connectors, contact pads, or other types of connectors may be used. Regardless of the type of connector used, this connector 505 provides access to the conductors of the flex circuit 402 through the connector opening 310 in the base deck 302 as illustrated above in FIG. 3.

Also shown in the example illustrated by FIG. 5 are two optional aligning features such posts 506 and 507. These, or similar posts, may be used to align the bulkhead connector 304 with the base deck 302 of a disc drive. The size, shape, and position of these posts 506 and 507 may vary widely depending on the configuration of the base deck 302. Alternatively, no posts may be used or alternative structures may be used to perform the same function. For example, a ridge along one or more sides of the bulkhead connector 304 may be used to align with corresponding slots in the base deck 302.

Figure 6:
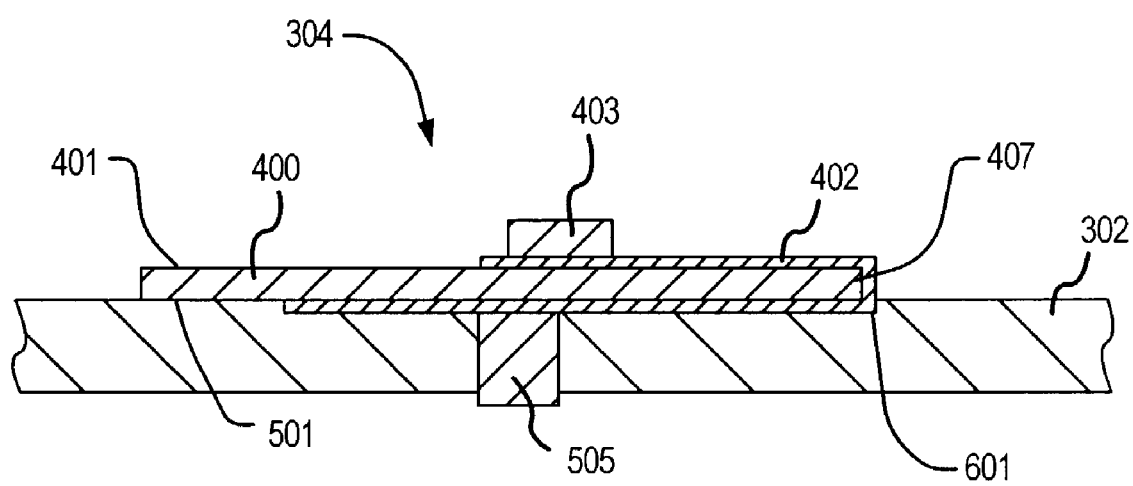
FIG. 6 is an enlarged cross-sectional side view of the bulkhead connector mounted to the base deck shown in FIG. 3.

FIG. 6 is an enlarged cross-sectional side view of the bulkhead connector 304 mounted to the base deck shown in FIG. 3. This example shows the base deck 302 with the mounted bulkhead connector 304. The flex circuit 402 can be seen extending across a top surface 401 of the backing plate 400, wrapping around one edge 407, and then extending across the bottom surface 501 of the backing plate 400.

As noted above, an adhesive bond is preferably used in place of prior art gaskets to provide a seal between the bulkhead connector 304 and the base deck 302. According to one embodiment, the adhesive bond joint is positioned between the edges of the backing plate 400 and the connector 505. The adhesive may be a liquid type of adhesive. Examples of adhesive types that may be used include but are not limited to epoxies, acrylics, hot metal adhesives, etc.

Regardless of the type of adhesive used, the adhesive should have low gas permeability. The permeability of the material used for the flex circuit 402 is typically very low. According to one embodiment, the permeability of the adhesive used is approximately the same as that of the material used in the flex circuit such as Kapton™. For example, a material such as 3M 460 epoxy may be used. This material, when applied in a 0.25 inch wide bond around a 3.6 inch perimeter with a thickness of 2 mils, has a leak rate at 70 degrees Celsius of $1.9^{e-9}$ cubic centimeters per second. This leak rate would be equivalent to losing 5 cubic centimeters of helium in 89 years. Other adhesives with similar permeability applied to different dimensions but yielding similar leak rates may also be suitable.

In the example illustrated in FIG. 6, the base deck 302 includes a recess 601 to accommodate the flex circuit 402. In this manner, the bulkhead connector 304 closely contacts the base deck 302 thereby providing an extremely thin adhesive layer and therefore a very tight seal. The leak rate of the adhesive seal is proportional to the thickness of the bond joint. That is, a thinner layer of adhesive provides less surface area at the ends of the bond joint exposed to either the internal atmosphere of the disc drive or the air outside of the drive. Therefore, the gas within the disc drive has a narrow path through which leaks may occur.

FIG. 6 also illustrates a top connector 403 and a bottom connector 505. These connectors 403 and 505 provide a means of making electrical connection with the conductors of the flex circuit 402. As indicated above, any type of commonly available connector may be used for either of these connectors 403 and 505. In an assembled disc drive, the top connector 403 is electrically coupled with the read/write heads of an actuator assembly and the bottom connector 505 provides access to the conductors of the flex circuit 402 through the connector opening 310 in the base deck 302.

Described in another way, disc drive (such as 100) in accordance with an exemplary preferred embodiment of the present invention has a rotatable disc (such as 108) carried by a spindle motor (such as 106) and an actuator assembly (such as 110) having a read/write head (such as 118). The disc drive has a base deck (such as 302) supporting the spindle motor (such as 106) and the actuator assembly (such as 110) and defining a connector opening (such as 310). A bulkhead connector (such as 304) is adhesively affixed to the base deck (such as 302) and covers the connector opening (such as 310). The bulkhead connector (such as 304) comprises a backing plate (such as 400) and a flex circuit (such as 402) bonded to the backing plate (such as 400). The flex circuit (such as 402) extends across a top surface (such as 401) of the backing plate (such as 400) wraps around one edge (such as 407) of the backing plate (such as 400), and extends across a bottom surface (such as 501) of the backing plate (such as 400).

Another embodiment of the present invention may be described as a method of hermetically sealing a connector opening (such as 310) formed in a base deck (such as 302) of a disc drive (such as 100). The base deck (such as 302) supports an actuator assembly (such as 110) having a read/write head (such as 118) adapted to fly over a rotating disc (such as 108). The method includes the step of bonding a flex circuit (such as 402) to a backing plate (such as 400) to form a bulkhead connector (such as 304). The flex circuit (such as 402) extends across a top surface (such as 401) of the backing plate (such as 400), wraps around one edge (such as 407) of the backing plate (such as 400), and extends across a bottom surface (such as 501) of the backing plate (such as 400). The next step includes adhesively affixing the bulkhead connector (such as 304) over the connector opening (such as 310) formed in the base deck (such as 302) of the disc drive (such as 100).

Yet another embodiment of the present invention may be described as a disc drive (such as 100) having a rotatable disc (such as 108) carried by a spindle motor (such as 106) and an actuator assembly (such as 110) having a read/write head (such as 118). The disc drive (such as 100) comprises a base deck (such as 302) supporting the spindle motor (such as 106) and the actuator assembly (such as 110) and defines a connector opening (such as 310) for passing an electrical signal from the read/write head (such as 118) through the base deck (such as 302). The disc drive (such as 100) also includes a means (such as 502) for hermetically sealing the connector opening (such as 310).

Thus, the present invention provides an improvement over prior bulkhead connectors which rely on traditional sealing methods such as a rubber gasket seal between the bulkhead connector and the base deck of the disc drive. This is because such prior art seals are unable to provide the type of hermetic seal required to prevent the leakage of gas, particularly when the gas has a relatively small atomic weight as in the case of helium. Indeed, such prior art seals were intended to keep environmental contaminants from entering the drive as opposed to keeping gas from leaking from the drive. The present invention solves this problem by providing a bulkhead connector adhesively affixed to the base deck and covering the connector opening. The bulkhead connector comprises a backing plate and a flex circuit bonded to the backing plate, the flex circuit extending across a top surface of the backing plate, wrapping around one edge of the backing plate, and extending across a bottom surface of the backing plate.

It will be clear that the present invention is well adapted to attain the ends and advantages mentioned as well as those inherent therein. While embodiments have been described for purposes of this disclosure, various changes and modifications may be made which are well within the scope of the present invention. For example, the configuration of the base deck and the dimensions of the bulkhead connector's backing plate may be altered to suit various applications. Additionally, the adhesive used to achieve a low permeability hermetic seal may also vary. Numerous other changes may be made which will readily suggest themselves to those skilled in the art and which are encompassed in the scope of the invention disclosed and as defined in the appended claims.

What is claimed is:

1. A disc drive comprising:
   a base deck supporting a spindle motor and an actuator assembly and defining a connector opening; and
   a bulkhead connector adhesively affixed to the base deck and covering the connector opening, the bulkhead connector comprising a backing plate, a flex circuit bonded to the backing plate, and an electrical connector coupled with the flex circuit and supported by the backing plate.

2. The disc drive of claim 1, wherein the flex circuit extends across a top surface of the backing plate, wraps around an edge of the backing plate, and extends across a bottom surface of the backing plate.

3. The disc drive of claim 1, wherein the electrical connector is disposed adjacent a top surface of the backing plate.

4. The disc drive of claim 3, wherein the electrical connector is coupled with a flex assembly, the flex assembly electrically coupled with a read/write head of the actuator assembly.

5. The disc drive of claim 1, wherein the bulkhead connector is adhesively affixed to the base deck with a low permeability liquid adhesive.

6. The disc drive of claim 5, wherein the electrical connector is disposed adjacent a bottom surface of the backing plate.

7. The disc drive of claim 5, wherein the liquid adhesive forms an even width bond joint around a perimeter of the bulkhead connector.

8. The disc drive of claim 1, wherein the electrical connector extends into the connector opening formed in the base deck.

9. The disc drive of claim 8, further comprising a gasket positioned between the bulkhead connector and the base deck to prevent excess adhesive from seeping into the electrical connector.

10. A method comprising steps of:
    bonding a flex circuit to a backing plate to form a bulkhead connector, the flex circuit extending across a top surface of the backing plate, wrapping around one edge of the backing plate, and extending across a bottom surface of the backing plate; and
    adhesively affixing the bulkhead connector over a connector opening formed in a base deck of a disc drive, the base deck configured to support a spindle motor and an actuator assembly.

11. The method of claim 10, further comprising coupling an electrical connector with the flex circuit on the top surface of the backing plate.

12. The method of claim 11, further comprising coupling a flex assembly to the electrical connector, wherein the flex assembly is electrically coupled with a read/write head of the actuator assembly.

13. The method of claim 10, further comprising coupling an electrical connector with the flex circuit on the bottom surface of the backing plate.

14. The method of claim 13, further comprising extending the electrical connector into the connector opening formed in the base deck.

15. The method of claim 10, wherein the adhesive affixing step comprises applying a low permeability liquid adhesive between the bulkhead connector and the base deck.

16. The method of claim 10, wherein the applying step further comprises applying the liquid adhesive to form a bond joint around a perimeter of the bulkhead connector, the bond joint having a cross-sectional width of aproximately 0.25 inches along the backing plate.

17. A disc drive comprising:
    a base deck comprising an internal surface configured to support a spindle motor and an actuator assembly and a sidewall surface depending from the internal surface to define a connector opening; and
    first means for hermetically sealing the connector opening and for electrically interconnecting the actuator with a device affixed to an external surface of the base deck.

18. The disc drive of claim 17, wherein the first means comprises a bulkhead connector adhesively affixed over the connector opening, the bulkhead connector comprising a backing plate, and a flex circuit bonded to the backing plate, and an electrical connector coupled with the flex circuit and supported by the backing plate.

19. The disc drive of claim 18, wherein the flex circuit extends across a top surface of the backing plate, wraps around an edge of the backing plate, and extends across a bottom surface of the backing plate.

20. The disc drive of claim 18, wherein the electrical connector is disposed adjacent a top surface of the backing plate and is coupled with a read/write head of the actuator assembly.

21. The disc drive of claim 18, wherein the electrical connector is disposed adjacent a bottom surface of the backing plate.

22. The disc drive of claim 21, wherein the electrical connector extends into the connector opening formed in the base deck.

23. The disc drive of claim 21, further comprising a gasket positioned between the bulkhead connector and the base deck to prevent said adhesive from seeping into the electrical connector.

* * * * *